United States Patent
Qiang et al.

(10) Patent No.: US 12,058,627 B2
(45) Date of Patent: Aug. 6, 2024

(54) CHANNEL QUALITY INDICATOR (CQI) REPORTING WITH CQI HEADROOM

(71) Applicant: Telefonaktiebolaget LM Ericsson (publ), Stockholm (SE)

(72) Inventors: Yongquan Qiang, Ottawa (CA); Hong Ren, Kanata (CA); Jianguo Long, Kanata (CA); Shiguang Guo, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 402 days.

(21) Appl. No.: 17/620,886

(22) PCT Filed: Jun. 28, 2019

(86) PCT No.: PCT/IB2019/055523
§ 371 (c)(1),
(2) Date: Dec. 20, 2021

(87) PCT Pub. No.: WO2020/260933
PCT Pub. Date: Dec. 30, 2020

(65) Prior Publication Data
US 2022/0330175 A1  Oct. 13, 2022

(51) Int. Cl.
*H04W 52/36* (2009.01)
*H04W 52/24* (2009.01)

(52) U.S. Cl.
CPC ....... *H04W 52/367* (2013.01); *H04W 52/241* (2013.01); *H04W 52/365* (2013.01)

(58) Field of Classification Search
CPC ............ H04W 52/367; H04W 52/241; H04W 52/365; H04B 7/0632; H04B 7/0623; H04L 1/0026
See application file for complete search history.

(56) References Cited

U.S. PATENT DOCUMENTS 10,412,690 B2 * 9/2019 Vajapeyam .......... H04W 72/21
10,736,046 B2 * 8/2020 MolavianJazi ....... H04W 52/08
(Continued)

OTHER PUBLICATIONS

International Search Report and Written Opinion dated Feb. 21, 2020, for corresponding International Application No. PCT/IB2019/055523, consisting of 11 pages.
(Continued)

*Primary Examiner* — Julio R Perez
(74) *Attorney, Agent, or Firm* — Weisberg I.P. Law, P.A.

(57) ABSTRACT

According to one or more embodiments, a wireless device configured to report one of a plurality of predefined Channel Quality Indicator (CQI) values is provided. A maximum CQI value of the plurality of predefined CQI values corresponds to any one of a plurality of signal characteristic values greater than or equal to a threshold signal characteristic value. The wireless device includes processing circuitry configured to determine a first signal characteristic value associated with a received signal. The processing circuitry is further configured to if the first signal characteristic value is greater than or equal to the threshold signal characteristic value associated with the maximum CQI value, generate a CQI report indicating: the maximum CQI value, and a power backoff from the first signal characteristic value that results in the threshold signal characteristic value.

32 Claims, 8 Drawing Sheets

```
                    BEGIN
                      |
                      v
┌─────────────────────────────────────────────────────────┐
│ Receive a CQI report, if a first signal characteristic  │
│ value is greater than or equal to the threshold signal  │
│ characteristic value associated with the maximum CQI    │
│ value where the CQI report indicates: the maximum CQI   │
│ value and a power back off from the first signal        │
│ characteristic value of the plurality of signal         │
│ characteristics values that results in the threshold    │
│ signal characteristic value                             │
│                        S134                             │
└─────────────────────────────────────────────────────────┘
                      |
                      v
┌─────────────────────────────────────────────────────────┐
│ Optionally estimate a second signal characteristic      │
│ value based at least in part on the CQI report          │
│                        S136                             │
└─────────────────────────────────────────────────────────┘
                      |
                      v
                     END
```

(56) References Cited

U.S. PATENT DOCUMENTS

| | | | |
|---|---|---|---|
| 10,912,042 B2* | 2/2021 | Zeng | H04W 52/0209 |
| 2018/0175997 A1* | 6/2018 | Liu | H04W 52/367 |
| 2019/0044644 A1* | 2/2019 | Yang | H04L 1/0025 |
| 2019/0313348 A1* | 10/2019 | MolavianJazi | H04W 52/365 |
| 2023/0019046 A1* | 1/2023 | Ibrahim | H04W 52/367 |

OTHER PUBLICATIONS

3GPP, A Global Initiative, 3GPP TS 38.214 V15.3.0 (Sep. 2018), Technical Specification, 3rd Generation Partnership Project; Technical Specification Group Radio Access Network; NR; Physical Layer Procedures for Data (Release 15), Valbonne, France, consisting of 96 pages.

3GPP, A Global Initiative, 3GPP TS 38.331 V15.3.0 (Sep. 2018), Technical Specification, 3rd Generation Partnership Project; Technical Specification Group Radio Access Network; NR; Radio Resource Control (RRC) Protocol Specification, (Release 15), Valbonne, France, consisting of 445 pages.

* cited by examiner

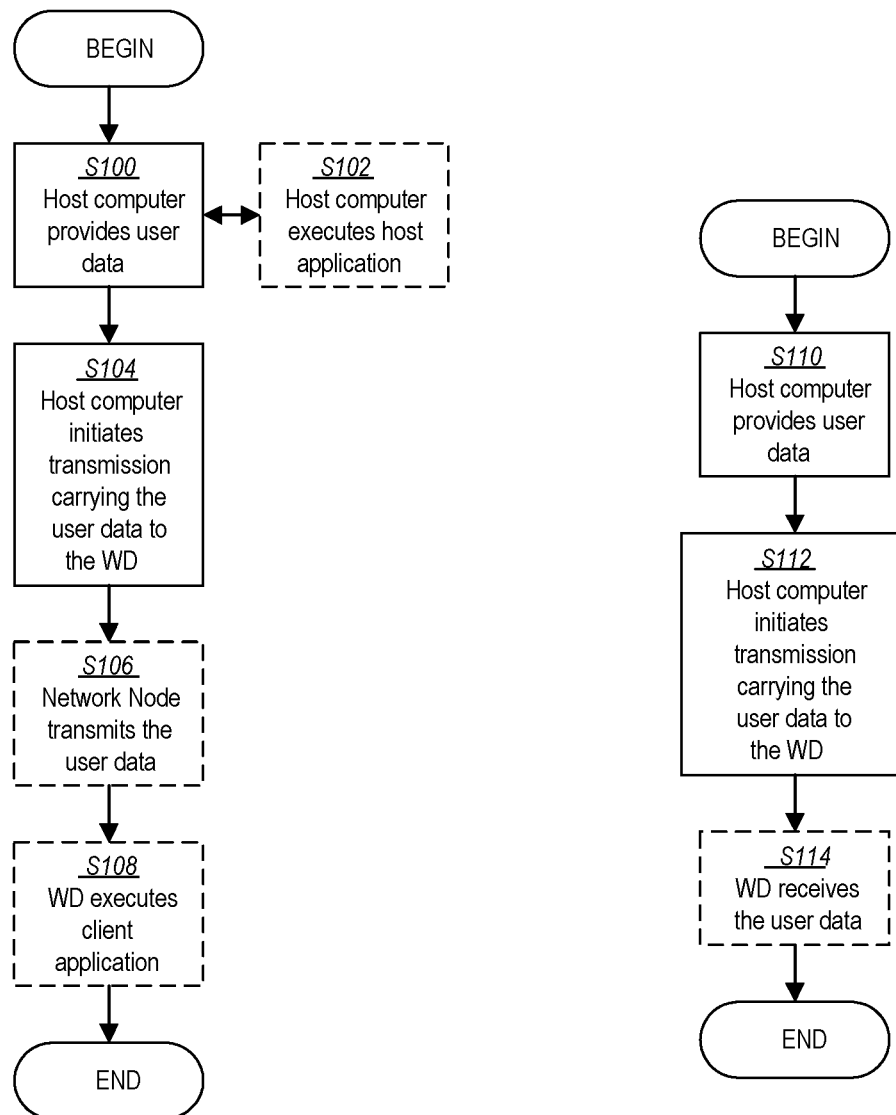

CHANNEL QUALITY INDICATOR (CQI) REPORTING WITH CQI HEADROOM

CROSS-REFERENCE TO RELATED APPLICATION

This application is a Submission Under 35 U.S.C. § 371 for U.S. National Stage Patent Application of International Application Number: PCT/IB2019/055523, filed Jun. 28, 2019 entitled "CHANNEL QUALITY INDICATOR (CQI) REPORTING WITH CQI HEADROOM," the entirety of which is incorporated herein by reference.

TECHNICAL FIELD

Wireless communication and in particular, to channel quality indicator (CQI) reporting with CQI headroom during CQI saturation.

BACKGROUND

Active antenna system (AAS) is a technology adopted by the $3^{rd}$ Generation Partnership Project (3GPP) for $4^{th}$ Generation (4G) Long Term Evolution (LTE) and $5^{th}$ Generation (5G) New Radio (NR) to help enhance the wireless network performance and capacity by using Full Dimension Multiple-Input Multiple-Output (FD-MIMO) or massive MIMO. An example AAS system includes of two-dimensional antenna elements array with M rows, N columns and K polarizations (K=2 in case of cross-polarization) as shown in FIG. 1.

The codebook-based precoding in AAS may be based on a set of pre-defined precoding matrices. The precoding matrix indication (PMI) may be selected by the wireless device with downlink (DL) Channel State Information Reference Signal (CSI-RS) or by the network node with uplink (UL) reference signals.

The precoding matrix, denoted as W, may be further described as for example a two-stage precoding structure as follows:

$$W = W_1 W_2.$$

The first stage of the precoding structure, i.e., $W_1$, may be described as a codebook, and consists essentially a group of 2-dimensional grid-of-beams (GoB), which may be characterized as $$W_1 = \begin{bmatrix} w_h \otimes w_v & 0 \\ 0 & w_h \otimes w_v \end{bmatrix},$$

where $w_h$ and $w_v$ are precoding vectors selected from over-sampled Discrete Fourier Transform (DFT) for horizontal direction and vertical direction, respectively, and may be expressed by $$w_h = \frac{1}{\sqrt{N}}\left[1, e^{\frac{j2\pi h}{NO_1}}, \ldots, e^{\frac{j2\pi n v}{NO_1}}, \ldots, e^{\frac{j2\pi(N-1)h}{NO_1}}\right]^T,$$

$$w_v = \frac{1}{\sqrt{M}}\left[1, e^{\frac{j2\pi v}{MO_2}}, \ldots, e^{\frac{j2\pi m v}{MO_2}}, \ldots, e^{\frac{j2\pi(M-1)v}{MO_2}}\right]^T$$

where $O_1$ and $O_2$ are the over-sampling rate in horizontal and vertical directions, respectively.

The second stage of the precoding matrix, i.e. $W_2$, is used for beam selection within the group of 2D GoB as well as the associated co-phasing between two polarizations.

At the wireless device, channel quality indicator (CQI) is reported according to the strongest beam (precoding matrix indicator (PMI)) and reported rank indicator (RI). CQI represents the coding rate supported with a given channel quality (e.g., SINR), PMI and RI. When SINR at the wireless device (i.e., measured and/or determined by the wireless device) surpasses a threshold, the maximum CQI 15 is reported as illustrated in FIG. 2. The highest modulation and coding rate may be scheduled. However, when an indication of CQI 15 is received by the network node and the CQI 15 corresponds to a saturated CQI, the network node has no additional information regarding the actual SINR at the wireless device side, except that CQI 15 may correspond to any one of the range of SINR values illustrated in FIG. 2.

However, a network node's inability to determine the actual SINR measured by the wireless device due to CQI saturation may cause various problems.

SUMMARY

Some embodiments advantageously provide a method and system for channel quality indicator (CQI) reporting with CQI headroom during CQI saturation.

In one or more embodiments, a method of extending a CQI report in AAS is provided. The network node configures the wireless device to provide an extended CQI report. The wireless device determines a CQI headroom over a maximum CQI. The wireless device reports additional CQI headroom to the network node using the existing CQI report. The network node is configured to obtain an extended PDSCH SINR (i.e., actual SINR) based at least in part on the CQI headroom report. In one or more embodiments, the network node may apply the extended CQI headroom for power back-off and power split.

According to one aspect of the disclosure, a wireless device configured to report one of a plurality of predefined Channel Quality Indicator (CQI) values is provided. A maximum CQI value of the plurality of predefined CQI values corresponds to any one of a plurality of signal characteristic values greater than or equal to a threshold signal characteristic value. The wireless device includes processing circuitry configured to: determine a first signal characteristic value associated with a received signal, and if the first signal characteristic value is greater than or equal to the threshold signal characteristic value associated with the maximum CQI value, generate a CQI report indicating: the maximum CQI value; and a power backoff from the first signal characteristic value that results in the threshold signal characteristic value.

According to one or more embodiments of this aspect, the power backoff is indicated in an information element (IE) separate from the indication of the maximum CQI value. According to one or more embodiments of this aspect, the processing circuitry is further configured to, if the first signal characteristic value is not greater than the threshold signal characteristic value associated with the maximum CQI value, generate a CQI report without the indication of the power backoff. According to one or more embodiments of this aspect, if the first signal characteristic value is not greater than the threshold signal characteristic value associated with the maximum CQI value, generate a CQI report indicating: the maximum CQI value; and the power backoff equal to zero.

According to one or more embodiments of this aspect, the CQI report is triggered based at least in part on one of: a preconfigured reporting periodicity, and Physical Uplink Shared Channel (PUSCH) Downlink Control Information (DCI). According to one or more embodiments of this aspect, if the first signal characteristic value is greater than the threshold signal characteristic value, the first signal characteristic value corresponding to a CQI saturation region. According to one or more embodiments of this aspect, the indication of the power backoff is one of: an additional CQI value included in the CQI report, the additional CQI value being mapped to a signal-to-interference-plus-noise ratio (SINR) value, and a SINR value. According to one or more embodiments of this aspect, the processing circuitry is further configured to cause transmission of a capability indication to the network node where the capability indication indicates a capability of determining the first signal characteristic value.

According to another aspect of the disclosure, a method implemented in a wireless device that is configured to report one of a plurality of predefined Channel Quality Indicator (CQI) values is provided. A maximum CQI value of the plurality of predefined CQI values corresponds to any one of a plurality of signal characteristic values at least equal to a threshold signal characteristic value. A first signal characteristic value associated with a received signal is determined. If the first signal characteristic value is greater than the threshold signal characteristic value associated with the maximum CQI value, a CQI report is generated that indicates: the maximum CQI value, and a power backoff from the first signal characteristic value that results in the threshold signal characteristic value.

According to one or more embodiments of this aspect, the power backoff is indicated in an information element (IE) separate from the indication of the maximum CQI value. According to one or more embodiments of this aspect, if the first signal characteristic value is not greater than the threshold signal characteristic value associated with the maximum CQI value, a CQI report without the indication of the power backoff is generated. According to one or more embodiments of this aspect, if the first signal characteristic value is not greater than the threshold signal characteristic value associated with the maximum CQI value, a CQI report indicating the maximum CQI value, and the power backoff equal to zero, is generated.

According to one or more embodiments of this aspect, the CQI report is triggered based at least in part on one of: a preconfigured reporting periodicity, and Physical Uplink Shared Channel (PUSCH) Downlink Control Information (DCI). According to one or more embodiments of this aspect, if the first signal characteristic value is greater than the threshold signal characteristic value, the first signal characteristic value corresponds to a CQI saturation region. According to one or more embodiments of this aspect, the indication of the power backoff is one of: an additional CQI value included in the CQI report, the additional CQI value is mapped to a signal-to-interference-plus-noise ratio (SINR) value, and a SINR value. According to one or more embodiments of this aspect, transmission of a capability indication to the network node is caused where the capability indication indicates a capability of determining the first signal characteristic value.

According to another aspect of the disclosure, a network node configured to communicate with a wireless device that is configured report one of a plurality of predefined CQI values is provided. A maximum CQI value of the plurality of predefined CQI values corresponds to any one of a plurality of signal characteristic values equal to or greater than a threshold signal characteristic value. The network node includes processing circuitry configured to: receive a CQI report, if a first signal characteristic value is greater than or equal to the threshold signal characteristic value associated with the maximum CQI value. The CQI report indicates the maximum CQI value, and a power backoff from the first signal characteristic value of the plurality of signal characteristics values that results in the threshold signal characteristic value. The processing circuitry is further configured to optionally estimate a second signal characteristic value based at least in part on the CQI report.

According to one or more embodiments of this aspect, the power backoff is indicated in an information element (IE) separate from the indication of the maximum CQI value. According to one or more embodiments of this aspect, if the first signal characteristic value is not greater than the threshold signal characteristic value associated with the maximum CQI value where the CQI report lacks the indication of the power backoff. According to one or more embodiments of this aspect, the power backoff is equal to zero.

According to one or more embodiments of this aspect, the processing circuitry is further configured to configure the wireless device to trigger the CQI report based at least in part on one of: a preconfigured reporting periodicity and Physical Uplink Shared Channel (PUSCH) Downlink Control Information (DCI). According to one or more embodiments of this aspect, if the first signal characteristic value is greater than the threshold signal characteristic value, the first signal characteristic value corresponds to a CQI saturation region. According to one or more embodiments of this aspect, the indication of the power backoff is one of: an additional CQI value included in the CQI report, the additional CQI value is mapped to a signal-to-interference-plus-noise ratio (SINR) value; and a SINR value. According to one or more embodiments of this aspect, the processing circuitry is further configured to receive a capability indication where the capability indication indicates a capability of determining the first signal characteristic value.

According to another aspect of the disclosure, a method implemented in a network node is provided. The network node is configured to communicate with a wireless device that is configured report one of a plurality of predefined CQI values. A maximum CQI value of the plurality of predefined CQI values corresponds to any one of a plurality of signal characteristic values at least equal to a threshold signal characteristic value. A CQI report is received where if a first signal characteristic value is greater than or equal to the threshold signal characteristic value associated with the maximum CQI value, the CQI report indicates the maximum CQI value, and a power backoff from the first signal characteristic value of the plurality of signal characteristics values that results in the threshold signal characteristic value. The first signal characteristic value is optionally estimated based at least in part on the CQI report.

According to one or more embodiments of this aspect, the power backoff is indicated in an information element (IE) separate from the indication of the maximum CQI value. According to one or more embodiments of this aspect, if the first signal characteristic value is not greater than the threshold signal characteristic value associated with the maximum CQI value, the CQI report lacks the indication of the power backoff. According to one or more embodiments of this aspect, the power backoff is equal to zero.

According to one or more embodiments of this aspect, the wireless device is configured to trigger the CQI report based at least in part on one of: a preconfigured reporting periodicity, and Physical Uplink Shared Channel (PUSCH) Downlink Control Information (DCI). According to one or more embodiments of this aspect, if the first signal characteristic value is greater than the threshold signal characteristic value, the first signal characteristic value corresponds to a CQI saturation region. According to one or more embodiments of this aspect, the indication of the power backoff is one of: an additional CQI value included in the CQI report, the additional CQI value is mapped to a signal-to-interference-plus-noise ratio (SINR) value; and a SINR value. According to one or more embodiments of this aspect, a capability indication is received where the capability indication indicating a capability of determining the first signal characteristic value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

DETAILED DESCRIPTION

Figure 1:
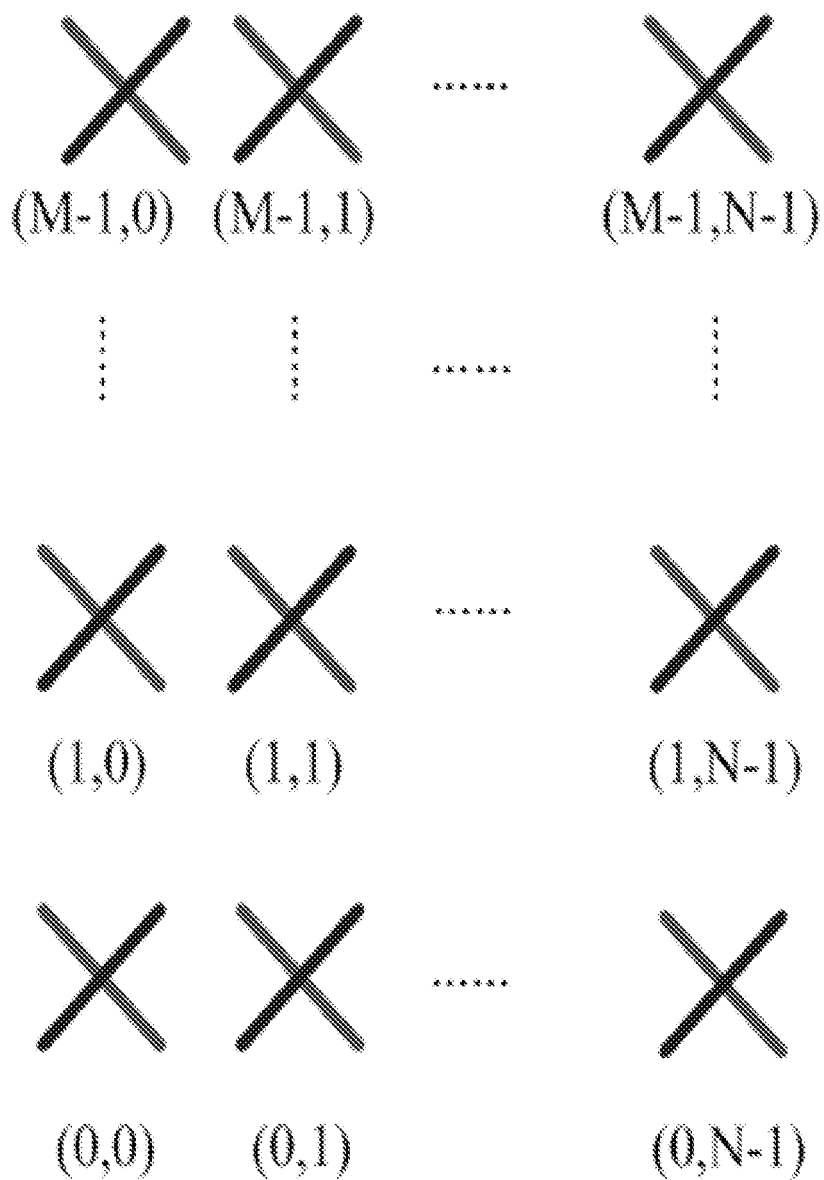
FIG. 1 is a diagram of a two-dimensional antenna array.
Figure 2:
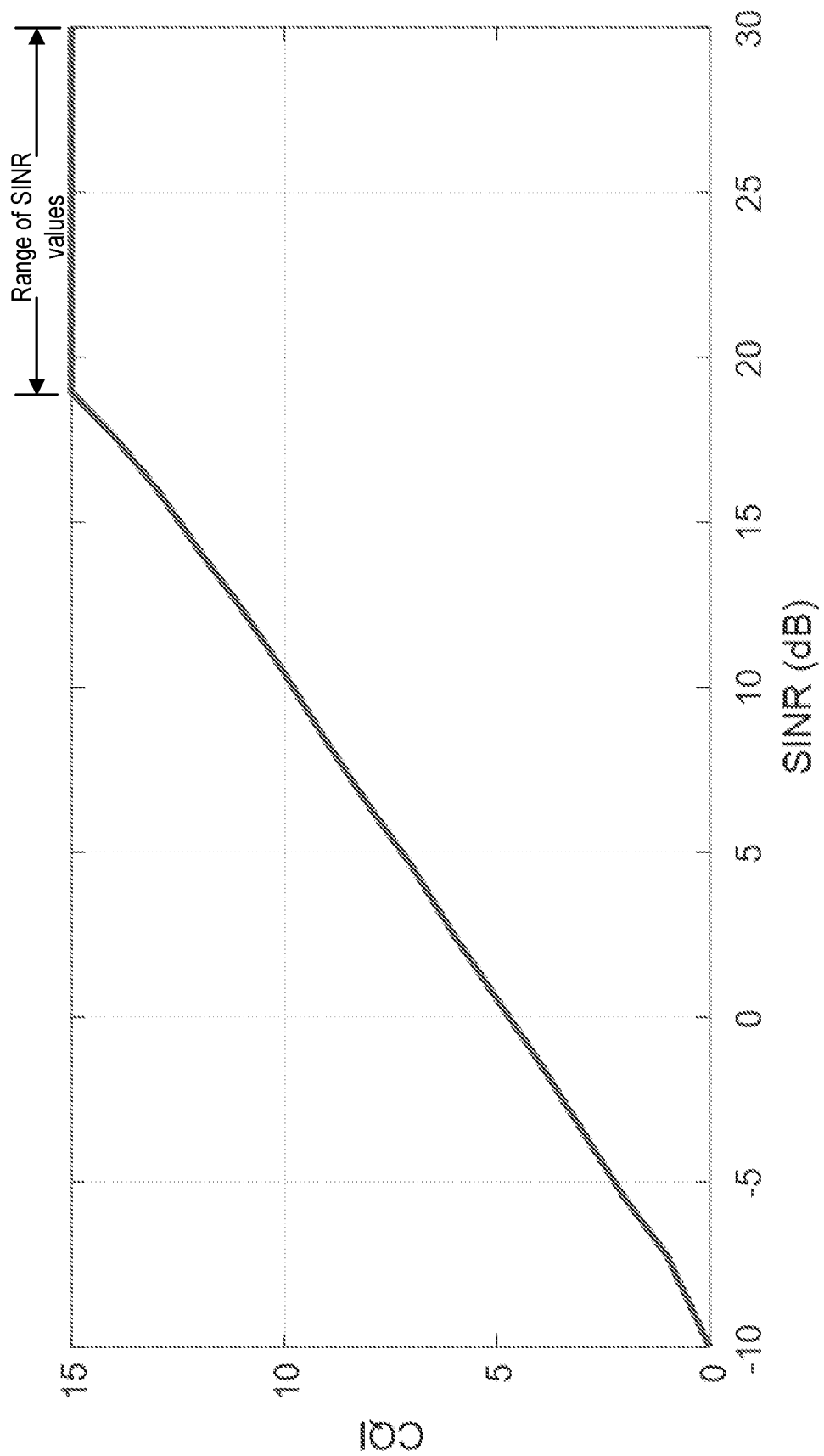
FIG. 2 is a diagram illustrating CQI saturation.

As discussed above, CQI saturation may cause various problems. Some examples of problems caused by CQI saturation are as follows:

High interference and power waste. In AAS with high beamforming gain, since the actual SINR at measured at the wireless device is unknown when CQI is saturated, the network node may transmit full power without backoff on the physical downlink shared channel (PDSCH), which causes high interference to neighboring cells. Further, transmission at full power may be a waste of power resources when a DL peak throughput may be achieved with less than full power.

SINR under-estimation in MU-MIMO. For MU-MIMO, the power may be split among co-scheduled wireless devices. Thus, the wireless device reported CQI may be backed-off according to a number of co-scheduled wireless devices. However, with saturated CQI 15, CQI backoff with power split might be inappropriate, since the SINR at the wireless device side might be under-estimated due to the CQI saturation, which may disadvantageously result in MU-MIMO SINR under-estimation by the network node.

One method to mitigate the CQI saturation is to configure the wireless device with a static power control offset. For instance, in NR, the power offset of PDSCH RE to NZP CSI-RS RE (powerControlOffset, e.g., −10 dB) is configured for the wireless device through RRC such that the wireless device always applies the power control offset before reporting CQI. Then, the wireless device reported CQI is backed-off by the configured powerControlOffset, expressed by:

$$CQI value\_reported=CQISINR\_Measured+powerControlOffset$$

At the network node, the PDSCH SINR can be derived from the wireless device's CQI report minus the preconfigured powerControlOffset plus outer-loop adjustment of PDSCH link adaptation, expressed by:

$$PDSCH\_SINR=CQI\_value\_reported-powerControlOffset+OLA$$

where OLA is an outer-loop adjustment (OLA) of PDSCH link adaption. In one or more embodiments, the OLA is stepped-up if an ACK is received, otherwise, the OLA is stepped-down if a NACK is received. The OLA may converge once the block error rate (BLER) target is achieved.

The problems from the above power control offset method may include one or more of the following:

Negatively Affecting the Lowest SINR Estimation

The minimum wireless device reported CQI is zero where CQI ranges from 0 to 15. At the network node side, CQI 0 is mapped to a minimum SINR, referred to CQI_0_SINR (e.g., −10 dB). With power control offset, the lowest SINR obtained at the network node side is CQ_0_SINR−powerControlOffset. For instance, without power control offset, the minimum SINR obtained at the network node may be −10 dB. While, with power control offset, the minimum SINR obtained at the network node increases to 0 dB. However, the network node will not be able to determine the actual SINR below 0 dB due to the power control offset. In other words, CQI 0, in this power control offset example, may correspond to any one of the SINR values from −10 dB to 0 dB where the network node has no way to determine the actual SINR of a wireless device that reports CQI 0.

Affecting a Rank Report

With power control offset in existing systems, the wireless device reported CQI is backed-off by powerControlOffset, which may result in a conservative rank estimation and report by the wireless device, even though the CQI can be compensated by powerControlOffset at the network node.

The instant disclosure advantageously helps solves one or more problems with existing systems and methods by configuring and/or providing channel quality indicator (CQI) reporting with CQI headroom during CQI saturation such as to allow the network node to determine if the transmit power can be split for MU-MIMO or back-off in SU-MIMO for mitigating interference to neighboring cells and saving energy.

Before describing in detail exemplary embodiments, it is noted that the embodiments reside primarily in combinations of apparatus components and processing steps related to channel quality indicator (CQI) reporting with CQI headroom during CQI saturation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
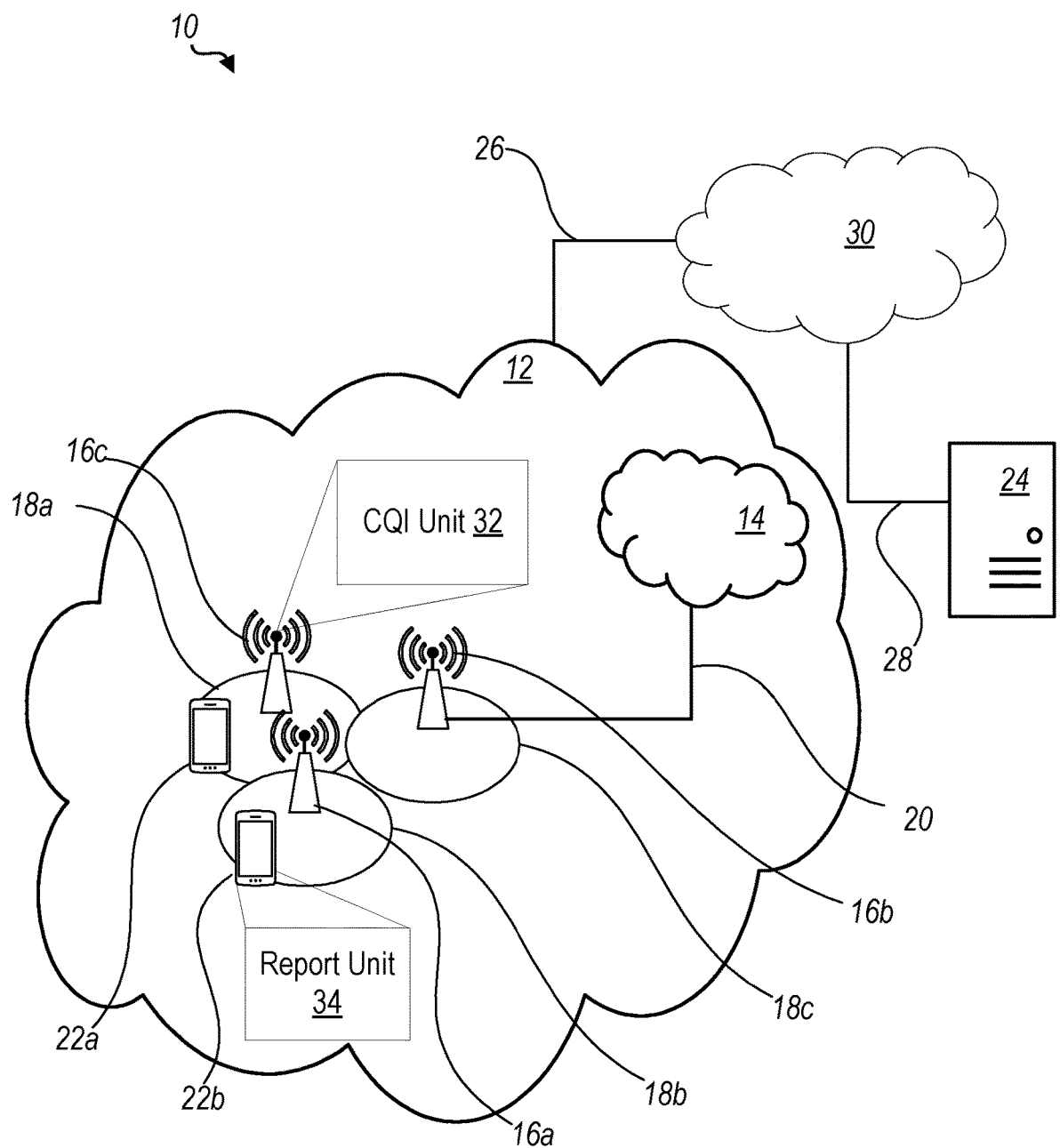
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a CQI unit 32 which is configured to perform one or more network node functions described herein such as with respect to CQI reporting with CQI headroom during CQI saturation. A wireless device 22 is configured to include a report unit 34 which is configured to perform one or more wireless device functions as described herein such as with respect to CQI reporting with dynamic CQI headroom during CQI saturation.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, determine, transmit, receive, forward, relay, store, manage, etc., information related to the CQI report with dynamic CQI headroom during CQI saturation.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include CQI unit 32 configured to perform one or more network node functions described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a report unit 34 configured to perform one or more wireless device functions described herein.

Figure 4:
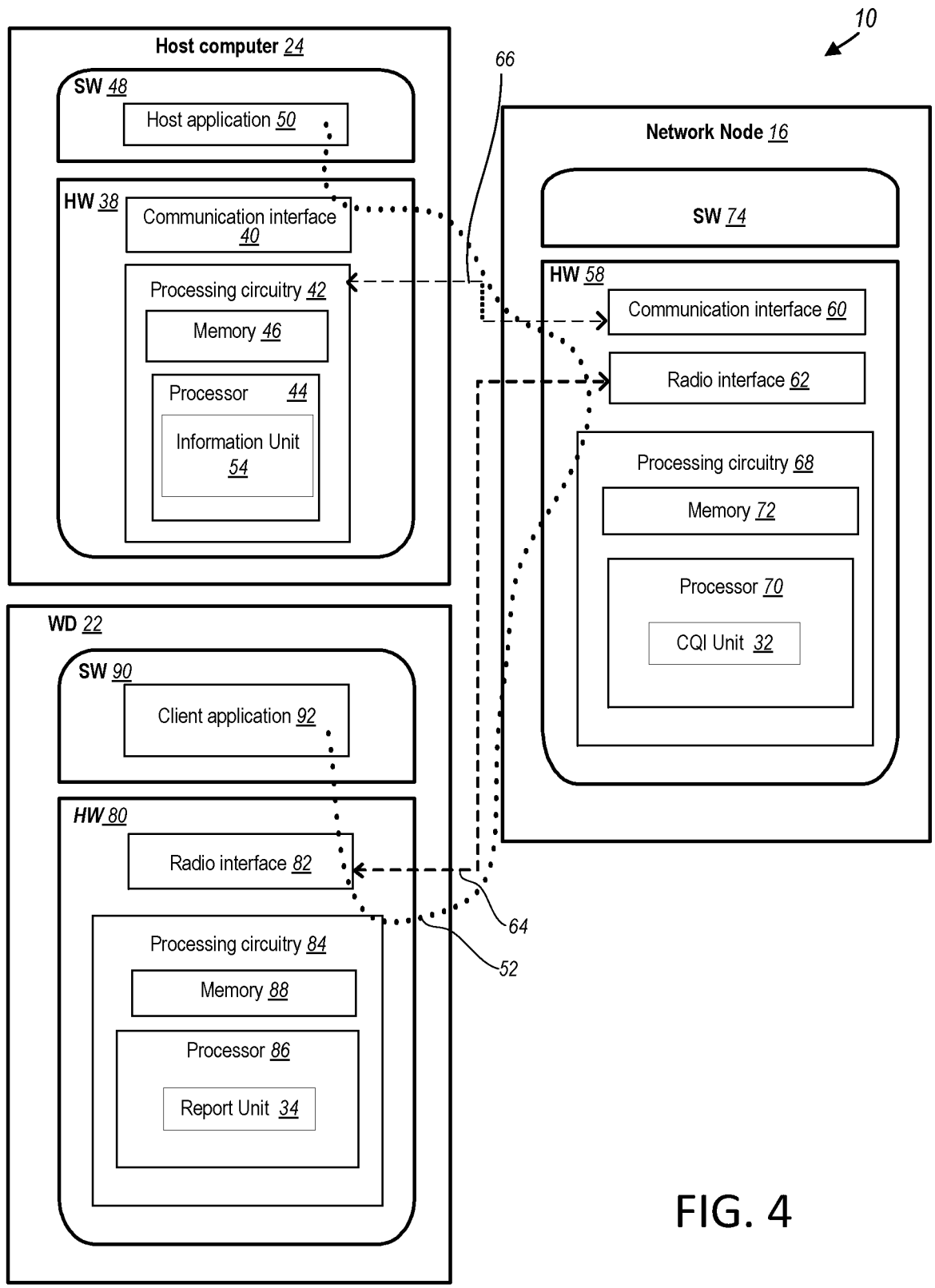
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as CQI unit 32, and report unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
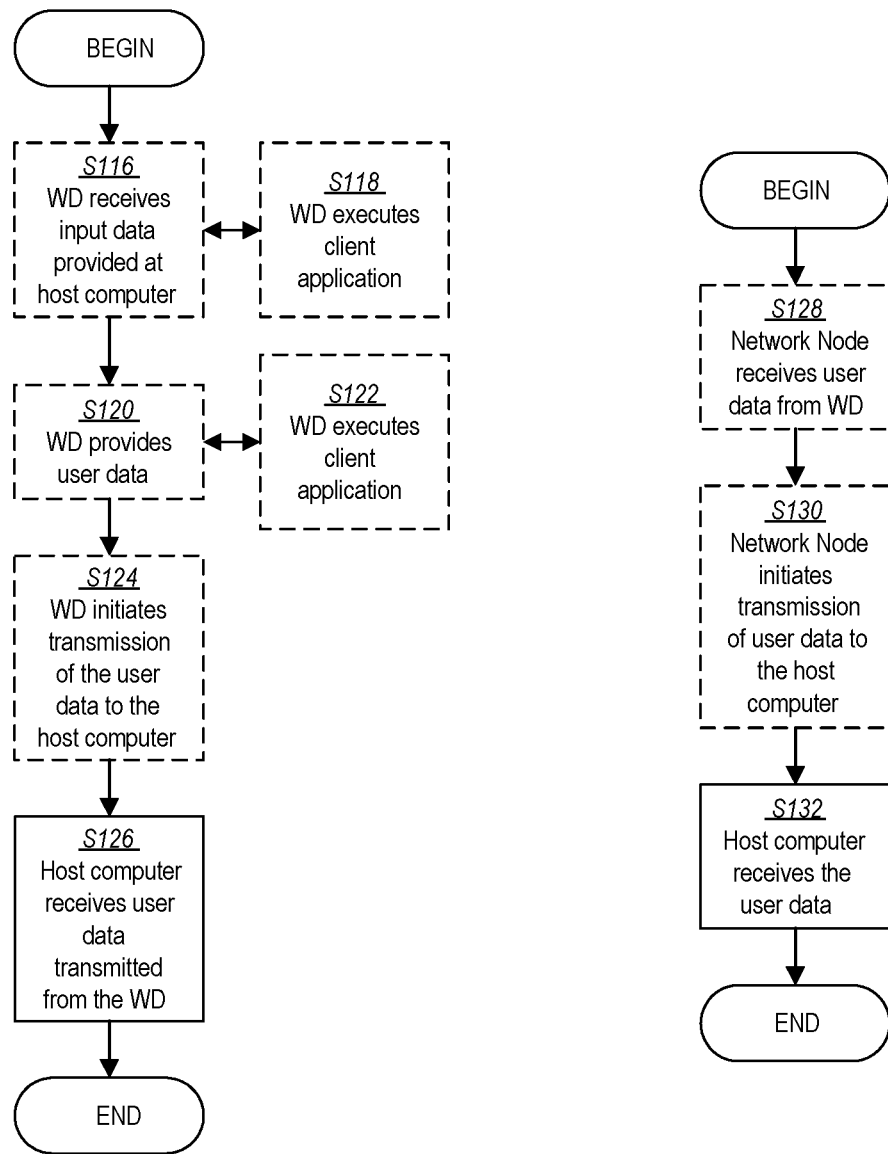
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
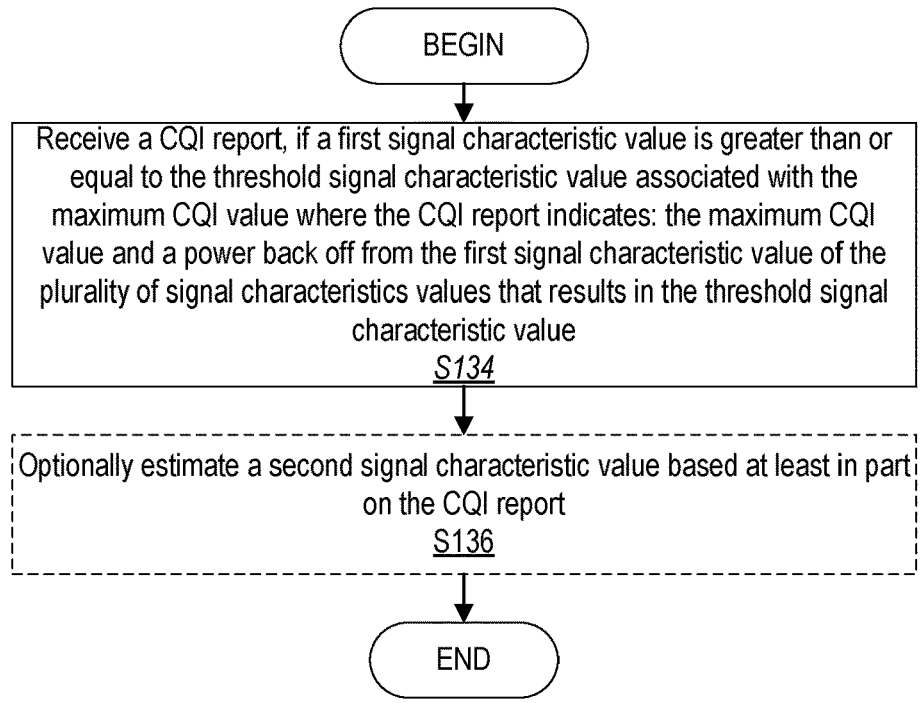
FIG. 9 is a flowchart of an exemplary process in a network node according to some embodiments of the present disclosure.

FIG. 9 is a flowchart of an exemplary process in a network node 16 according to some embodiments of the present disclosure. One or more Blocks and/or functions performed by network node 16 may be performed by one or more elements of network node 16 such as by CQI unit 32 in processing circuitry 68, processor 70, radio interface 62, etc. In one or more embodiments, the network node 16 is configured to communicate with the wireless device 22 that is configured report one of a plurality of predefined CQI values where a maximum CQI value of the plurality of predefined CQI values corresponds to any one of a plurality of signal characteristic values at least equal to a threshold signal characteristic value.

In one or more embodiments, network node 16 such as via one or more of processing circuitry 68, processor 70, communication interface 60 and radio interface 62 is configured to receive (Block S134) a CQI report where if a first signal characteristic value is greater than or equal to the threshold signal characteristic value associated with the maximum CQI value, the CQI report indicating: the maximum CQI value, and a power backoff from the first signal characteristic value of the plurality of signal characteristics values that results in the threshold signal characteristic value, as described herein. In one or more embodiments, network node 16 such as via one or more of processing circuitry 68, processor 70, communication interface 60 and radio interface 62 is configured to optionally estimate (Block S136) the first signal characteristic value based at least in part on the CQI report, as described herein.

Having generally described arrangements for network node 16, details for one or more of these arrangements, functions and processes are provided as follows.

Obtaining/Estimating Extended PDSCH SINR (i.e., Signal Characteristic Value) Based at Least in Part on Extended CQI Report Including a CQI Headroom Report In one or more embodiments, when an indication of CQI 15 (i.e., maximum CQI value) with headroom (i.e., with an indicated headroom or power backoff value) is received by network node 16 such via radio interface 62, the actual PDSCH SINR measured by wireless device 22 can be estimated by:

$$PDSCH\_SINR = CQI\_15\_SINR + CQI\_Headroom\_SINR$$

Thus, the range of possible PDSCH SINR is extended by CQI headroom report where the network node 16 is able to determine the PDSCH SINR value (i.e., first signal characteristic) measured by the wireless device 22 during situations when CQI 15 is indicated by the wireless device 22.

Network node 16, such as via processing circuitry 68, e.g., including CQI unit 32, and/or radio interface 62, may be configured to perform at least one action based at least in part on the determined/estimated SINR value from the CQI headroom report. For example, the extended PDSCH SINR can be used by the network node 16, such as via processing circuitry 68, to split power among co-scheduled wireless devices 22. For instance, if wireless device 22 is reporting, i.e., indicating, CQI 15 with 6 dB headroom such as via radio interface 82, the network node 16 such a via processing circuitry 68 may determine to pair various wireless devices 22, e.g., four wireless devices 22, without LA back-off. Without the CQI headroom report, 6 dB LA back-off may be needed, which results in conservative SINR estimation for co-scheduled wireless devices 22, thereby negatively affecting throughput. In another example of an action performed by network node 16, such as via processing circuitry 68, e.g., including CQI unit 32, and/or radio interface 62, network node 16 may use the determined SINR value from the CQI headroom report for power backoff for SU-MIMO to reduce the transmitted power and interference to neighboring cells.

According to one or more embodiments, the power backoff is indicated in an information element (IE) separate from the indication of the maximum CQI value. According to one or more embodiments, if the first signal characteristic value is not greater than the threshold signal characteristic value associated with the maximum CQI value, the CQI report lacking the indication of the power backoff. According to one or more embodiments, the power backoff is equal to zero.

According to one or more embodiments, the processing circuitry 68 is further configured to configure the wireless device 22 to trigger the CQI report based at least in part on one of: a preconfigured reporting periodicity, and Physical Uplink Shared Channel (PUSCH) Downlink Control Information (DCI). According to one or more embodiments, if the first signal characteristic value is greater than the threshold signal characteristic value, the first signal characteristic value corresponding to a CQI saturation region. According to one or more embodiments, the indication of the power backoff is one of: an additional CQI value included in the CQI report, the additional CQI value being mapped to a signal-to-interference-plus-noise ratio (SINR) value; and a SINR value. According to one or more embodiments, the processing circuitry 68 is further configured to receive a capability indication to the network node 16, the capability indication indicating a capability of determining the first signal characteristic value.

In one or more embodiments, the network node 16, such as via processing circuitry 68, e.g., including CQI unit 32, and/or radio interface 62, can configure the wireless device 22 with a CQI headroom report that may be part of the extended CQI report. In one or more embodiments, the CQI headroom report may be configured by network node 16 through RRC signaling. A new IE (e.g., cqiHeadRoomReportConfig) can be introduced in CSI-ReportConfig, in which, the CQI headroom configurations may be indicated to wireless device 22. For instance, the CQI headroom:

Wideband or subband CQI headroom report.
Periodic, aperiodic or semi-persistent CQI headroom report.
The length of CQI headroom report bits.
The mapping between CQI headroom bits and SINR headroom values.

Figure 10:
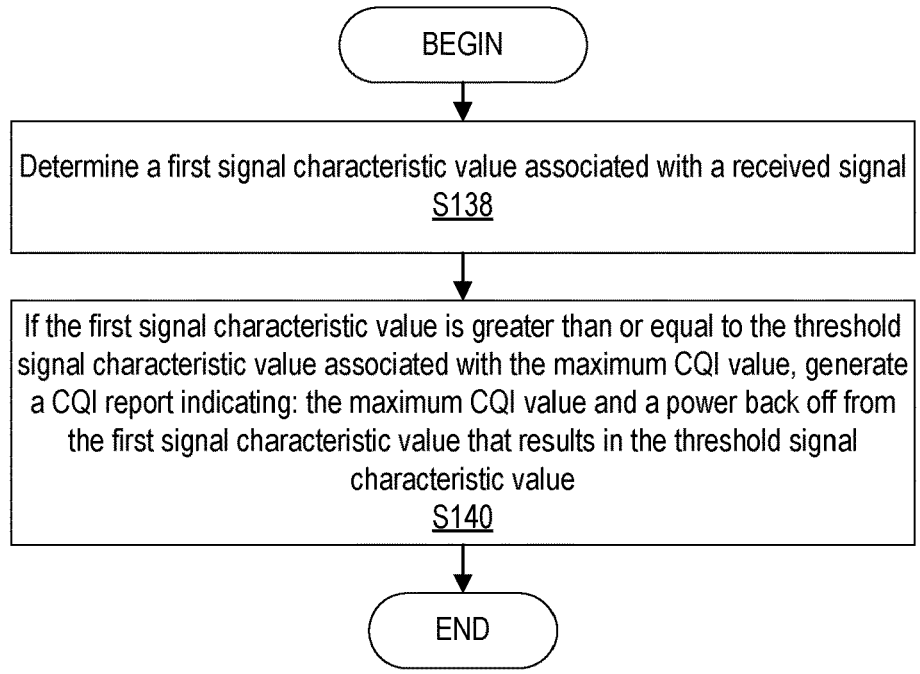
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions performed by wireless device 22 may be performed by one or more elements of wireless device 22 such as by report unit 34 in processing circuitry 84, processor 86, radio interface 82, etc. In one or more embodiments, wireless device 22 such as via one or more of processing circuitry 84, report unit 34, processor 86 and radio interface 82 is configured to determine (Block S138) determine a first signal characteristic value associated with a received signal. For example, in one or more embodiments, wireless device 22, such as via processing circuitry 84, e.g., including report unit 34, and/or radio interface 82, may be configured to report one of a plurality of predefined CQI values, a maximum CQI value of the plurality of predefined CQI values corresponding to any one of a plurality of signal characteristic values (e.g., SINR values) at least equal to a threshold signal characteristic value.

In one or more embodiments, wireless device 22 such as via one or more of processing circuitry 84, report unit 34, processor 86 and radio interface 82 is configured to, if the first signal characteristic value is greater than the threshold signal characteristic value associated with the maximum CQI value, if the first signal characteristic value is greater than or equal to the threshold signal characteristic value associated with the maximum CQI value, generate (Block S140) a CQI report indicating: the maximum CQI value, and a power backoff from the first signal characteristic value that results in the threshold signal characteristic value.

According to one or more embodiments, the power backoff is indicated in an information element (IE) separate from the indication of the maximum CQI value. According to one or more embodiments, the processing circuitry 84 is further configured to, if the first signal characteristic value is not greater than the threshold signal characteristic value associated with the maximum CQI value, generate a CQI report without the indication of the power backoff. According to one or more embodiments, if the first signal characteristic value is not greater than the threshold signal characteristic value associated with the maximum CQI value, generate a CQI report indicating: the maximum CQI value, and the power backoff equal to zero.

According to one or more embodiments, the CQI report is triggered based at least in part on one of: a preconfigured reporting periodicity, and Physical Uplink Shared Channel (PUSCH) Downlink Control Information (DCI). According to one or more embodiments, if the first signal characteristic value is greater than the threshold signal characteristic value, the first signal characteristic value corresponding to a CQI saturation region. According to one or more embodiments, the indication of the power backoff is one of: an additional CQI value included in the CQI report, the additional CQI value is mapped to a signal-to-interference-plus-noise ratio (SINR) value; and a SINR value. According to one or more embodiments, the processing circuitry 84 is further configured to cause transmission of a capability indication to the network node 16, the capability indication indicating a capability of determining the first signal characteristic value.

Having generally described arrangements for wireless device 22, details for one or more of these arrangements, functions and processes are provided as follows.

Determine CQI Headroom at the Wireless Device 22

Figure 11:
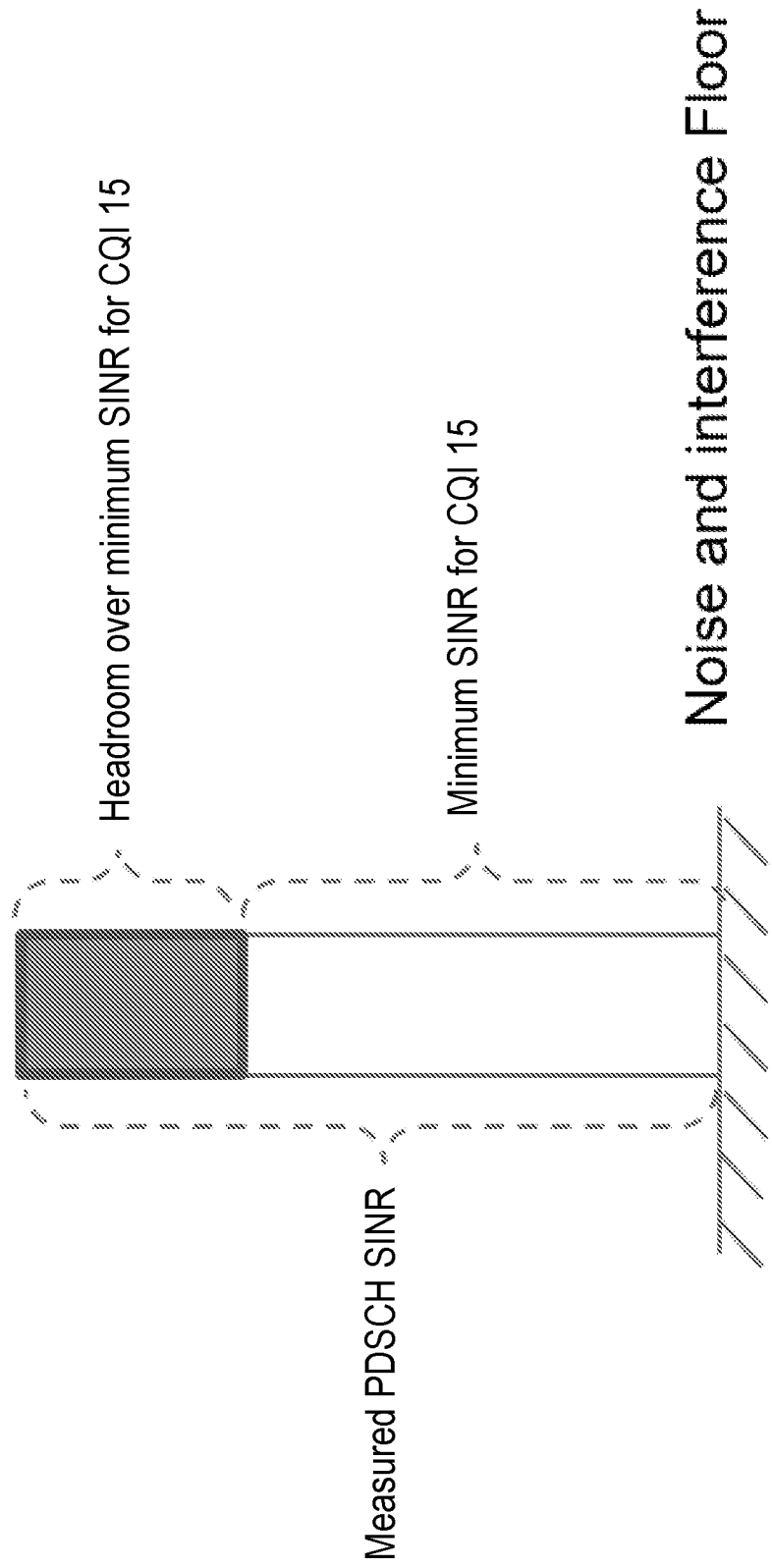
FIG. 11 is a block diagram of CQI headroom in accordance with some embodiments of the disclosure.

With associated PMI and RI, if maximum CQI is reached at the wireless device 22 as determined by wireless device 22 such as via processing circuitry 84, e.g., including report unit 34, and/or radio interface 82, the CQI headroom may be determined by wireless devices 22, such as via processing circuitry 84, e.g., including report unit 34, and/or radio interface 82. The CQI headroom is the maximum power backoff which can be applied to secure the maximum CQI with corresponding PMI and RI. For example, in one or more embodiments, the CQI headroom corresponds to a second signal characteristic value that corresponds to a power backoff from the first signal characteristics value that results in the threshold signal characteristic value. FIG. 11 illustrates an example of CQI headroom. For example, PDSCH SINR is measured and/or determined at wireless device 22, such as via processing circuitry 84, e.g., including report unit 34, and/or radio interface 82, where the PSDCH SINR quantity is a headroom value greater than the threshold SINR for CQI 15 and/or greater than a minimum SINR value of the SINR values associated with CQI 15.

In one example, if the corresponding SINR for maximum CQI 15 is 20 dB with a PMI and RI, in case of 25 dB SINR measured on PDSCH by wireless device 22, there is a 5 dB headroom over CQI 15. This information (e.g., CQI headroom or signal characteristic value) can be reported to network node 16 such that network node 16 can perform at least one action based on the CQI headroom. In one or more embodiments, the at least one action includes a power backoff for SU-MIMO or power split for MU-MIMO. In one or more embodiments, if CQI is determined by processing circuitry 84 and/or report unit 34 to be below 15, there may be no room for power backoff or power split such that the wireless device 22 may, for example, report a CQI headroom of zero or may omit the CQI headroom report from the extended CQI report. Report of CQI is described in detail below.

Reporting CQI Headroom

CQI headroom may be reported together with associated CSI report such as if CQI saturation is determined to exist. In one or more embodiments, the CQI headroom can be quantified to saved CQI headroom values that are mapped to headroom SINR values (e.g., signal characteristics values), for example with 4 bits CQI headroom report and SINR mapping table below.

TABLE 1

CQI Headroom and SINR mapping

| CQI headroom reported values | CQI headroom SINR values (dB) |
|---|---|
| 0 | 0 |
| 1 | 2 |
| 2 | 4 |
| 3 | 6 |
| 4 | 8 |
| 5 | 10 |
| 6 | 12 |
| 7 | 14 |
| 8 | 16 |
| 9 | 18 |
| 10 | 20 |
| 11 | 22 |
| 12 | 24 |
| 13 | 26 |
| 14 | 28 |
| 15 | 30 and above |

In one or more embodiments, the CQI headroom value corresponds to the power backoff value that is indicated to the network node 16. In one or more embodiments, the CQI headroom report may be triggered in a similar manner to the triggering of the CSI report. For example, the CQI headroom report may be triggered in one or more instances as follows:
- triggered in a pre-configured manner similar to the triggering of the periodic report.
- triggered by bits in the PUSCH DCI similar to an aperiodic report.
- triggered in a similar manner as a semi-persist report.

In one or more embodiments, the indication of the power backoff may be triggered if CQI saturation is detected by wireless device 22 such as based at least in part on the PDSCH SINR measured by the wireless device, such as via processing circuitry 84, e.g., including report unit 34, and/or radio interface 82. In one or more embodiments, wireless device 22 may indicate, such as via processing circuitry 84, e.g., including report unit 34, and/or radio interface 82, whether the CQI report is an extended CQI report, i.e., whether the CQI report includes a power backoff or headroom indication. In one or more embodiments, the CQI report described herein may refer to two or more CQI reports where the CQI headroom or power backoff indication may be included in a CQI headroom report separate from the CQI report.

Abbreviations that may be used in the preceding description include:

| Abbreviation | Explanation |
|---|---|
| AAS | Active Antenna System |
| BBU | Baseband Unit |

-continued

| Abbreviation | Explanation |
|---|---|
| BFG | Beamforming Gain |
| CQI | Channel Quality Indicator |
| CSI-RS | Channel State Information Reference Signal |
| DFT | Discrete Fourier Transform |
| DMRS | Demodulation Reference Signal |
| FD-MIMO | Full Dimension MIMO |
| GoB | Grid-of-beams |
| PBF | Power Back-off Factor |
| PMI | Precoding Matrix Indicator |
| RRH | Remote Radio Head |
| SRS | Sounding Reference Symbol |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device configured to report one of a plurality of predefined Channel Quality Indicator (CQI) values, a maximum CQI value of the plurality of predefined CQI values corresponding to one of a plurality of signal characteristic values greater than or equal to a threshold signal characteristic value, the wireless device comprising processing circuitry configured to:
   determine a first signal characteristic value associated with a received signal;
   generate a CQI report if the first signal characteristic value is greater than or equal to the threshold signal characteristic value associated with the maximum CQI value, the CQI report indicating the maximum CQI value and a power backoff from the first signal characteristic value that results in the threshold signal characteristic value.

2. The wireless device of claim 1, wherein the power backoff is indicated in an information element (IE) separate from the indication of the maximum CQI value.

3. The wireless device of claim 1, wherein the processing circuitry is further configured to, if the first signal characteristic value is not greater than the threshold signal characteristic value associated with the maximum CQI value, generate a CQI report without the indication of the power backoff.

4. The wireless device of claim 1, wherein if the first signal characteristic value is not greater than the threshold signal characteristic value associated with the maximum CQI value, generate a CQI report indicating the maximum CQI value and the power backoff equal to zero.

5. The wireless device of claim 1, wherein the CQI report is triggered based at least in part on one of:
   a preconfigured reporting periodicity; and
   Physical Uplink Shared Channel (PUSCH) Downlink Control Information (DCI).

6. The wireless device of claim 1, wherein if the first signal characteristic value is greater than the threshold signal characteristic value, the first signal characteristic value corresponding to a CQI saturation region.

7. The wireless device of claim 1, wherein the indication of the power backoff is one of:
   an additional CQI value included in the CQI report, the additional CQI value being mapped to a signal-to-interference-plus-noise ratio (SINR) value; and
   a SINR value.

8. The wireless device of claim 1, wherein the processing circuitry is further configured to cause transmission of a capability indication to a network node, the capability indication indicating a capability of determining the first signal characteristic value.

9. A method implemented in a wireless device that is configured to report one of a plurality of predefined Channel Quality Indicator (CQI) values, a maximum CQI value of the plurality of predefined CQI values corresponding to one of a plurality of signal characteristic values at least equal to a threshold signal characteristic value, the method comprising:
   determining a first signal characteristic value associated with a received signal;
   generating a CQI report if the first signal characteristic value is greater than the threshold signal characteristic value associated with the maximum CQI value, the CQI report indicating the maximum CQI value and a power backoff from the first signal characteristic value that results in the threshold signal characteristic value.

10. The method of claim 9, wherein the power backoff is indicated in an information element (IE) separate from the indication of the maximum CQI value.

11. The method of claim 9, further comprising, if the first signal characteristic value is not greater than the threshold signal characteristic value associated with the maximum CQI value, generating a CQI report without the indication of the power backoff.

12. The method of claim 9, wherein if the first signal characteristic value is not greater than the threshold signal characteristic value associated with the maximum CQI value, generating a CQI report indicating the maximum CQI value and the power backoff equal to zero.

13. The method of claim 9, wherein the CQI report is triggered based at least in part on one of:
   a preconfigured reporting periodicity; and
   Physical Uplink Shared Channel (PUSCH) Downlink Control Information (DCI).

14. The method of claim 9, wherein if the first signal characteristic value is greater than the threshold signal characteristic value, the first signal characteristic value corresponding to a CQI saturation region.

15. The method of claim 9, wherein the indication of the power backoff is one of:
- an additional CQI value included in the CQI report, the additional CQI value being mapped to a signal-to-interference-plus-noise ratio (SINR) value; and
- a SINR value.

16. The method of claim 9, further comprising causing transmission of a capability indication to a network node, the capability indication indicating a capability of determining the first signal characteristic value.

17. A network node configured to communicate with a wireless device that is configured report one of a plurality of predefined CQI values, a maximum CQI value of the plurality of predefined CQI values corresponding to one of a plurality of signal characteristic values equal to or greater than a threshold signal characteristic value, the network node comprising processing circuitry configured to:
- receive a CQI report, if a first signal characteristic value is greater than or equal to the threshold signal characteristic value associated with the maximum CQI value, the CQI report indicating the maximum CQI value and a power backoff from the first signal characteristic value of the plurality of signal characteristics values that results in the threshold signal characteristic value; and
- optionally estimate a second signal characteristic value based at least in part on the CQI report.

18. The network node of claim 17, wherein the power backoff is indicated in an information element (IE) separate from the indication of the maximum CQI value.

19. The network node of claim 17, wherein if the first signal characteristic value is not greater than the threshold signal characteristic value associated with the maximum CQI value, the CQI report does not include the indication of the power backoff.

20. The network node of claim 17, wherein the power backoff that results in the threshold signal characteristic value is equal to zero.

21. The network node of claim 17, wherein the processing circuitry is further configured to configure the wireless device to trigger the CQI report based at least in part on one of:
- a preconfigured reporting periodicity; and
- Physical Uplink Shared Channel (PUSCH) Downlink Control Information (DCI).

22. The network node of claim 17, wherein if the first signal characteristic value is greater than the threshold signal characteristic value, the first signal characteristic value corresponding to a CQI saturation region.

23. The network node of claim 17, wherein the indication of the power backoff is one of:
- an additional CQI value included in the CQI report, the additional CQI value being mapped to a signal-to-interference-plus-noise ratio (SINR) value; and
- a SINR value.

24. The network node of claim 17, wherein the processing circuitry is further configured to receive a capability indication, the capability indication indicating a capability of determining the first signal characteristic value.

25. A method implemented in a network node, the network node being configured to communicate with a wireless device that is configured report one of a plurality of predefined CQI values, a maximum CQI value of the plurality of predefined CQI values corresponding to one of a plurality of signal characteristic values at least equal to a threshold signal characteristic value, the method comprising:
- receiving a CQI report, if a first signal characteristic value is greater than or equal to the threshold signal characteristic value associated with the maximum CQI value, the CQI report indicating the maximum CQI value and a power backoff from the first signal characteristic value of the plurality of signal characteristics values that results in the threshold signal characteristic value; and
- optionally estimating the first signal characteristic value based at least in part on the CQI report.

26. The method of claim 25, wherein the power backoff is indicated in an information element (IE) separate from the indication of the maximum CQI value.

27. The method of claim 25, wherein if the first signal characteristic value is not greater than the threshold signal characteristic value associated with the maximum CQI value, the CQI report does not include the indication of the power backoff.

28. The method of claim 25, wherein the power backoff that results in the threshold signal characteristic value is equal to zero.

29. The method of claim 25, further comprising configuring the wireless device to trigger the CQI report based at least in part on one of:
- a preconfigured reporting periodicity; and
- Physical Uplink Shared Channel (PUSCH) Downlink Control Information (DCI).

30. The method of claim 25, wherein if the first signal characteristic value is greater than the threshold signal characteristic value, the first signal characteristic value corresponding to a CQI saturation region.

31. The method of claim 25, wherein the indication of the power backoff is one of:
- an additional CQI value included in the CQI report, the additional CQI value being mapped to a signal-to-interference-plus-noise ratio (SINR) value; and
- a SINR value.

32. The method of claim 25, further comprising receiving a capability indication, the capability indication indicating a capability of determining the first signal characteristic value.

* * * * *